United States Patent
Yianilos et al.

(10) Patent No.: US 7,363,325 B2
(45) Date of Patent: Apr. 22, 2008

(54) SYNCHRONIZABLE TRANSACTIONAL DATABASE METHOD AND SYSTEM

(75) Inventors: Peter N. Yianilos, Princeton, NJ (US); Sumeet Sobti, Princeton, NJ (US); Alexy Khrabrov, Cranbury, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 1258 days.

(21) Appl. No.: 09/927,589

(22) Filed: Aug. 10, 2001

(65) Prior Publication Data

US 2002/0029214 A1 Mar. 7, 2002

Related U.S. Application Data

(60) Provisional application No. 60/224,270, filed on Aug. 10, 2000.

(51) Int. Cl.
G06F 17/30 (2006.01)
(52) U.S. Cl. .................................................. 707/201
(58) Field of Classification Search .................. 707/1, 707/2, 3, 7, 10, 101, 201, 202; 710/200, 710/305; 713/100
See application file for complete search history.

(56) References Cited

U.S. PATENT DOCUMENTS

| | | | | |
|---|---|---|---|---|
| 5,089,952 A | * | 2/1992 | Bozman | 710/200 |
| 5,440,732 A | * | 8/1995 | Lomet et al. | 707/1 |
| 5,463,772 A | * | 10/1995 | Thompson et al. | 707/101 |
| 5,668,958 A | * | 9/1997 | Bendert et al. | 710/305 |
| 5,778,375 A | * | 7/1998 | Hecht | 707/101 |
| 5,860,079 A | * | 1/1999 | Smith et al. | 713/100 |
| 5,991,771 A | * | 11/1999 | Falls et al. | 707/202 |
| 6,141,664 A | * | 10/2000 | Boothby | 707/201 |
| 6,185,514 B1 | * | 2/2001 | Skinner et al. | 702/188 |
| 6,453,404 B1 | * | 9/2002 | Bereznyi et al. | 711/171 |
| 6,560,599 B1 | * | 5/2003 | Boa et al. | 707/7 |
| 6,574,750 B1 | * | 6/2003 | Felber et al. | 714/20 |

OTHER PUBLICATIONS

Chen, Y. et al., "A Prototype Implementation of Archival Intermemory," ACM Conf. On Digital Lib, 1999.
Goldberg, A. V. et al., "Towards an Archival Intermemory," Advances in Digital Libraries ADL, 1998.
Ganger, G.R. et al., "Metadata Update Performance in File Systems," USENIX, First Symposium on Operating Systems Design and Implementation, 1994.
Seltzer, M. et al, "LIBTP: Portable, Modular Transactions for UNIX," USENIX, 1992.
Evfimievski, A.V., "A Probabilistic Algorithm for Updating Files Over a Communication Link," ACM-SIAM Sym. On Discrete Algorithms, 1998.

(Continued)

*Primary Examiner*—Etienne Leroux
(74) *Attorney, Agent, or Firm*—Scully, Scott, Muprhy & Presser, P.C.

(57) ABSTRACT

A database system that can synchronize all or a part of its contents over a limited bandwidth link is described. The lowest layer of the system, the bedrock layer, implements a transactional block store. On top of this is a B+-tree that can efficiently compute a digest (hash) of the records within any range of key values in O(log n) time. The top level is a communication protocol that directs the synchronization process such that minimization of bits communicated, rounds of communication, and local computation are simultaneously addressed.

13 Claims, 4 Drawing Sheets

OTHER PUBLICATIONS

Orlitsky, A. "Interactive Communication of Balanced Distributions and of Correlated Files," SIAM J. Disc. Math, vol. 6, No. 4, 1993.

Callaghan, B. et al., "NFS Version 3 protocol Specification," Technical Report, Sun Microsystems, Inc., 1995.

Evans, J., "Design and Implementation of a Transaction-Based Filesystem on FreeBSD," USENIX—The Advanced Computing Systems Association, 1999.

Lee, Y-W et al., "Operation-based Update Propagation in a Mobile File System," USENIX—The Advanced Computing Systems Association, 1999.

Olson, M.A. et al., "Berkley DB."

Nowicki, B., "NFS: Network File System Protocol Specification," Technical Report, Sun Microsystems, Inc., 1989.

Tridgell, A. et al., "The rsync Algorithm," Technical Report (TR-CS-96-05) The Australian national University, 1996.

Petersen, Karin, et al. "Flexible Update Propagation for Weakly Consistent Replication," Computer Science Laboratory, Xerox Palo Alto Research Center, Palo Alto, CA.

Ganger, G.R. et al., "Metadata Update Performance in File Systems," USENIX, First Symposium on Operating Systems Design and Implementation, 1994.

Seltzer, M. et al, "LIBTP:Portable, Modular Transactions for UNIX," USENIX, 1992.

Evfimievski, A. V., "A Probabilistic Algorithm for Updating Files Over a Communication Link," ACM-SIAM Sym. On Discrete Algorithms, 1998.

Orlitsky, A. "Interactive Communication of Balanced Distributions and of Correlated Files," SIAM J. Disc. Math, vol. 6, No. 4, 1993.

Tridgell, A. et al., "The rsync Algorithm," Technical Report (TR-CS-96-05) The Australian national University, 1996; and.

* cited by examiner

SYNCHRONIZABLE TRANSACTIONAL DATABASE METHOD AND SYSTEM

CROSS REFERENCES TO RELATED APPLICATIONS

This application claims the benefit of U.S. Provisional Application, Ser. No. 60/224,270 filed on Aug. 10, 2000.

BACKGROUND OF THE INVENTION

This invention relates to the design and implementation of a database system that includes among its basic functions the ability to efficiently synchronize all data within a specified key range. A transactional database system is used for transaction processing. This system generally consists of centrally storing information and allowing access to this information by users. User access typically consists of read, write, delete, and update interaction with the information on the database. These interactions are referred to as transactions.

The information on the database can be vital for many reasons. The database might store banking information and its users may rely on it to accurately reflect information on thousands of accounts. The database might store medical information and its users may rely on it to properly diagnose or monitor the health of a patient.

Transactional systems may be accessed thousands of times a day and its information may be altered each time. It is often imperative to insure the security of this information. These systems also face a variety of reasons to fail. Therefore, it is common for such databases to be backed up and the information made available for recovery if a failure is faced.

A common method of backup for a transactional database is synchronization. Synchronization typically involves a primary host and a secondary host. Transactions are first processed on the primary database, the secondary database is periodically synchronized or made consistent with the primary database and is used as a backup and part of a recovery system. The role of primary and secondary may be dynamic making synchronization a multi-directional path.

Since multiple copies of the information are being kept, the copies must be kept consistent. To synchronize the databases they must both compare and transfer data.

A synchronizable database D is a set containing records of the form (key, value). The key field takes values from a totally ordered set K of keys. Any key in K occurs in D at most once.

The major operations supported by a synchronizable database as an abstract data type are insertion, deletion and retrieval of records, and a range synchronization operation. The first three are standard operations on databases with records. The last one is unique to synchronizable databases.

The input to a range synchronization operation is an interval I of K and two databases $D_1$ and $D_2$. The operation basically tries to make the restrictions of $D_1$ and $D_2$ to I identical. In particular, it identifies three sets of keys, which are called the discrepancy sets $K_1$, $K_2$ and $K_{12}$. These three sets are all subsets of the key interval I. Discrepancy set $K_1$ is the set of keys in $D_1$ which are not in $D_2$, $K_2$ is the set of keys in $D_2$ which are not in $D_1$, and $K_{12}$ is the set of keys which are in both $D_1$ and $D_2$ but whose corresponding records in the two databases differ in the value field.

The operation calls different handler functions for each of these three sets. Typically, the handler functions for $K_1$ and $K_2$ would copy the missing records from one database to the other. The handler function for $K_{12}$ would typically, for each key in the discrepancy set, compare the records in $D_1$ and $D_2$ that have the key and replace one of them with the other.

Since synchronization relies on the comparison and transfer of data, efficiency lies in the actions of comparing and transferring. As used herein, efficiency is an attribute of the cost of comparing and transferring data and the time intervals of comparing and transferring data.

There are many transactional systems currently in use and under development. Berkeley db system provides a generalized transactional library, which relies on logging. The db provides transactional functionality plus further database features. SQRL, a free SQL project for FreeBSD, extends the notion of a transactional substrate further to provide a transaction-based file system.

Figure 1:
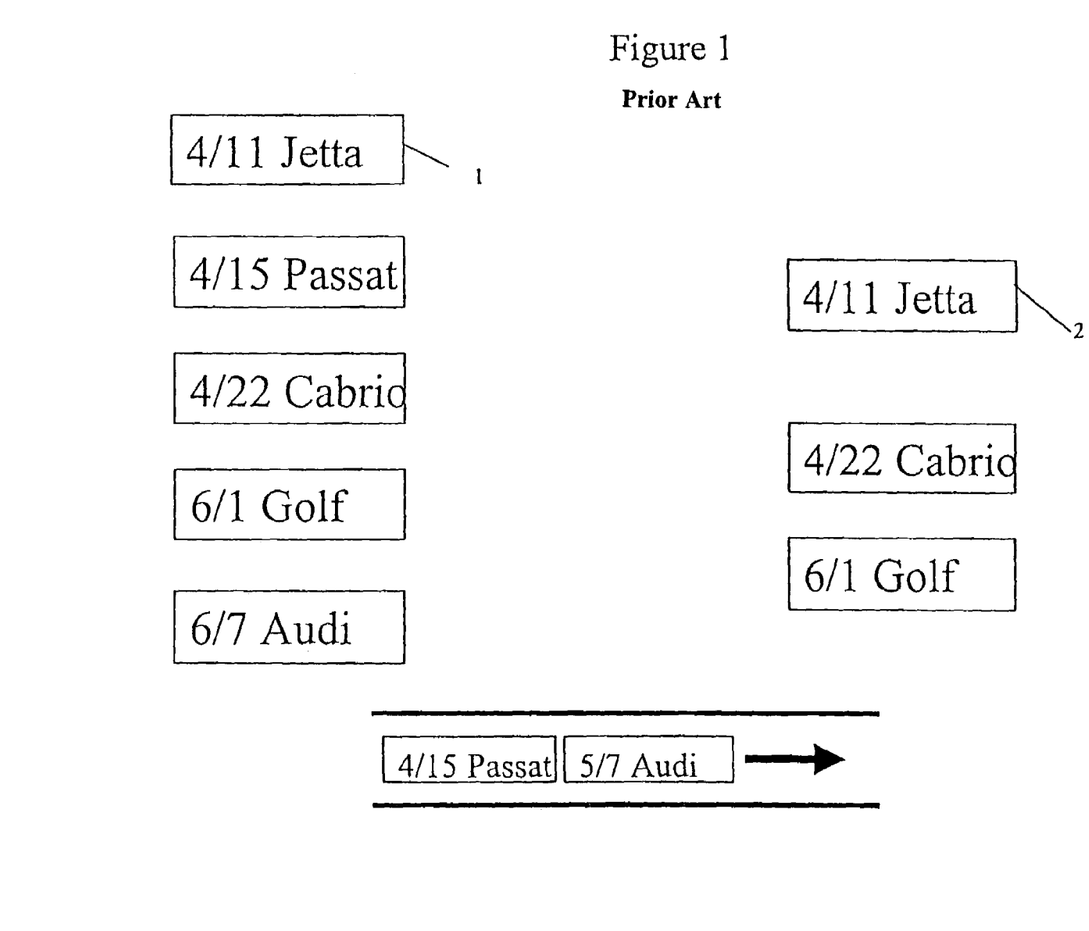
FIG. 1 depicts a synchronizable database.

FIG. 1 depicts a synchronizable database. On the left, the figure depicts a car dealer's database, 1, that maintains a schedule of factory repairs. Each time a customer needs a factory repair, the dealer schedules it in his database. The factory, on the right, maintains a master schedule of repairs, 2. Periodically the two must be synchronized—in this case the new and changed orders must be copied from the dealer's site to the factory site and inserted into the factory's database. In order to rapidly identify the records to be transferred, the databases each support a special facility for efficient computation of a digest (hash) of any specified range of keys, which amounts to a summary of the range. This special facility corresponds to the invention's summarizable database abstraction. An efficient synchronizations facility then uses this smart summarization mechanism to minimize the amount of data that must be transferred.

SUMMARY OF THE INVENTION

The invention consists of three layers. The bottom bedrock layer implements a block-oriented storage abstraction with transactional support. On top of it is built an enhanced B+-tree (bxtree layer) that supports an additional operation to efficiently compute a digest (hash) of the records within a specified range of key values. The top layer, osynch, implements a communication protocol for pairwise range synchronization that uses the digest function of bxtree to simultaneously reduce local computation, bits communicated, as well as communication rounds.

The bedrock abstraction consists of an array of fixed length blocks addressed by logical index. In addition to "allocate", "free", "read", and "write" operations, the abstraction provides a function to atomically commit all changes to the array. During operation a block mapping system redirects writes intended to overwrite a given logical block address, to a free physical block leaving the original data intact. At the same time this logical address is tentatively mapped to the physical block containing the new data written. The commit operation atomically switches all maps in memory and on disk so that these tentative mappings are made permanent. In this way bedrock provides transactional support at the lowest level of the system. Higher-level applications, including a synchronizable database system, may then use bedrock to build arbitrary data structures that inherit from below a transactional capability.

Bedrock operates within a single, preallocated file or in a raw disk environment and uses no outside logging facility. Following a system crash no recovery process is required. The data-store is instantly available in its most recently committed state. Bedrock uses a three-level mapping system that supports up to $2^{31}$ fixed length blocks. It represents an easy-to-administer and scalable substrate for many applications that require simple transactional support.

The bxtree layer features support for variable length records and keys, and all data is written in a portable (byte order independent) fashion. Maintained along with each data record is a fixed-length digest computed by a cryptographically strong function such as the well-known MD5 algorithm. Bxtree extends a conventional B+-tree by providing a function that, given a range of key values, efficiently computes the exclusive or (XOR) of the digest values associated with each record in the specified range. It does this by maintaining at each internal tree node, the XOR of all children. With this approach the MD5/XOR summary of an arbitrary range in the database may be computed in O(log n) time where n denotes the number of records in the database.

In the osynch protocol, two parties exchange digests of key ranges and subranges to rapidly identify regions of discrepancy. These discrepancies are then dealt with by exchanging data. The design of osynch and bxtree is aimed at minimizing the complexity of synchronization measured in terms of bits communicated, rounds of communication, and local computation. The protocol has a simple recursive structure and may be modified to adjust the tradeoff between these three objectives. The preferred embodiment reflects a tradeoff that seems appropriate for today's computational and internet environment.

The number of rounds is asymptotically O(log n) to identify each region of discrepancy, and the local computation is $O(t \log^2 n)$ where t denotes the total number of discrepancies. The end result is that the total bits communicated is roughly proportional to the amount of differing data.

Large databases and other complex data structures maintained in non-volatile storage, e.g. on disk, often have certain important invariants to be preserved at all times for the data to make sense. In order to write data with the invariants always preserved, the updates must be made transactionally. It is desirable to have an abstraction of transactional memory, general enough to be used by many applications.

DETAILED DESCRIPTION OF THE DRAWING

Figure 2:
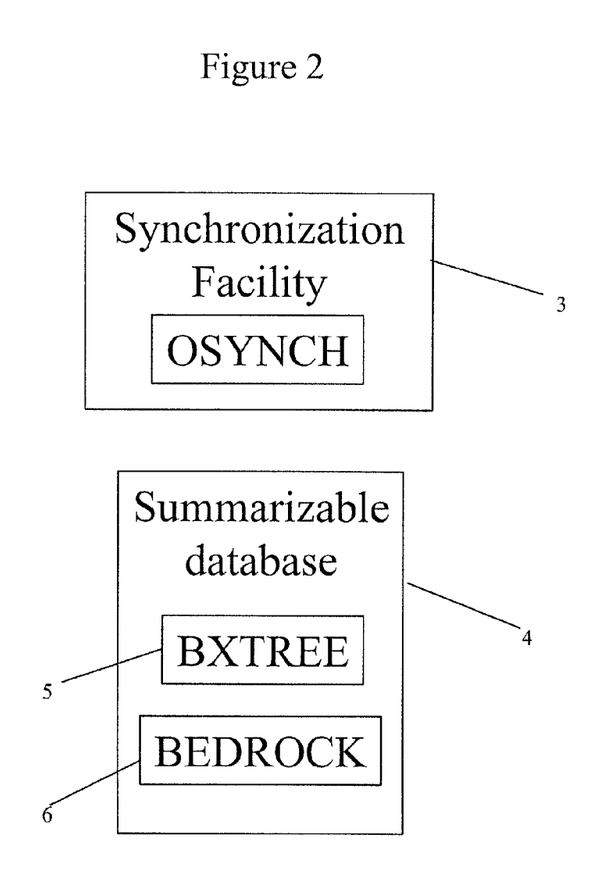
FIG. 2 depicts the software architecture of the invention.

FIG. 2 depicts the software architecture of the invention. Presented is a synchronizable database as three modules: OSYNCH, 3, provides the synchronization facility, and the BXTREE and BEDROCK modules together comprise the summarizable database, 4. The BXTREE module, 5, implements an industrial strength B+-TREE, enhanced with summaries. Hashing the leaf data and storing the hashes in the leaves, and storing XOR's of all the children nodes along with each parent node produce the summaries. The BEDROCK, 6, module provides a transactional non-volatile storage layer, which allows for consistent, safe updates of the BXTREE, 5.

The bedrock is a transactional memory management system. It allows complex updates to be enacted (committed, synced) atomically (at once), over non-volatile block storage devices, such as hard drives, and to persist from one sync to the next. If an intermediate series of updates fails to commit, the previously committed state is guaranteed to be found where it was left by the previous, successfully completed commit. Any such updates in progress after a commit can be aborted forcefully, and then the previously committed state will be reactivated.

The bedrock layer consists of a disk block array and a mapping mechanism allowing for two "views" of the blocks. The ongoing updates correspond to shadow blocks, reflected in the shadow maps. The previously committed transaction persists, its blocks intact, its maps current and safely in place, governed by a single superblock. Once the updates are finished, they can be committed with a single atomic write of the new superblock, which swaps the current maps and the shadow ones. Each set of maps refers to their own blocks, so formerly shadow blocks now also become current.

Figure 3:
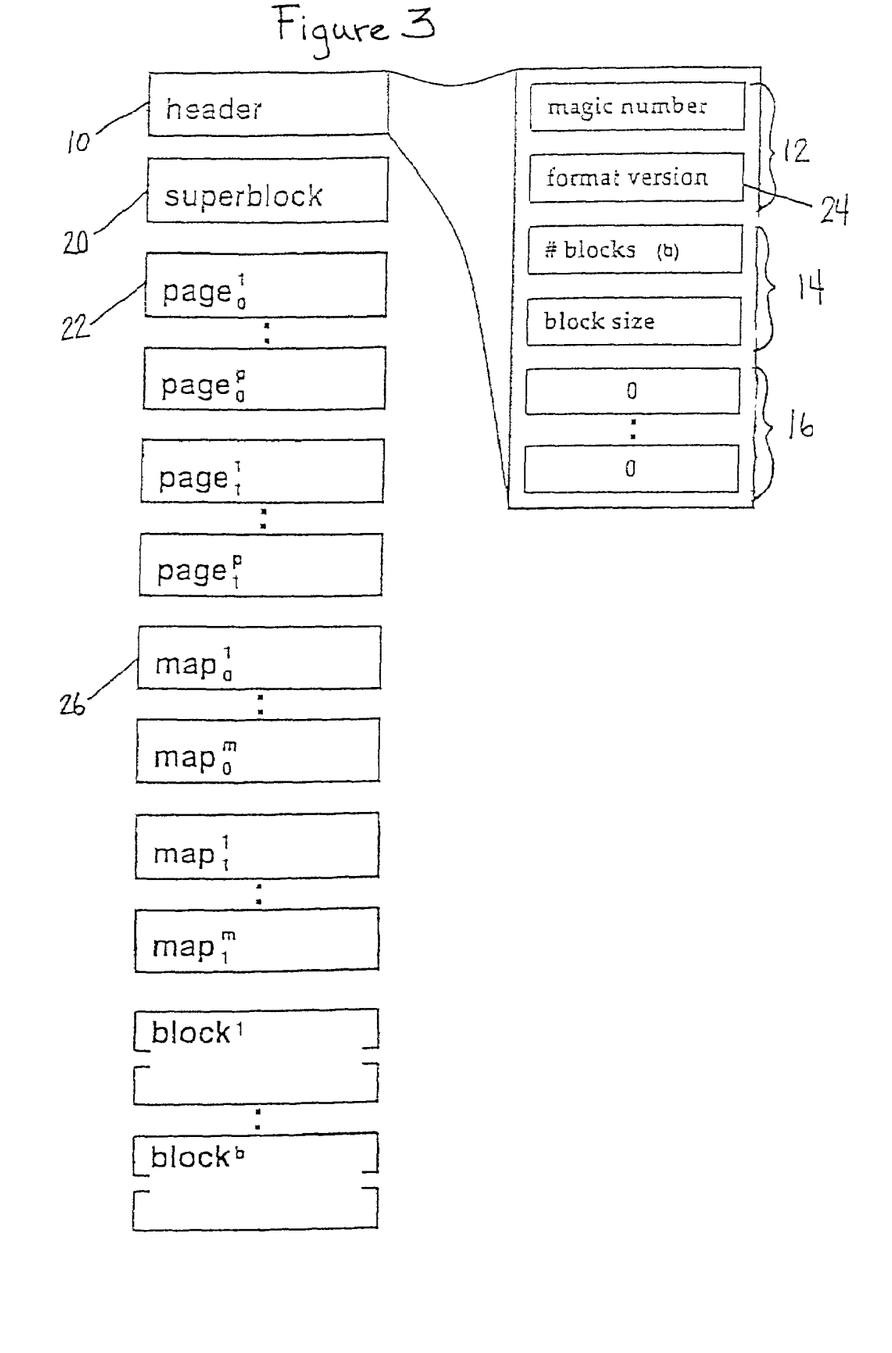
FIG. 3 represents the layout of a bedrock file.

FIG. 3 depicts the layout of a bedrock file in non-volatile memory. Header, 10, consists of essential bedrock parameters, 12, and mapping mechanism, 14, in fixed size segments, followed by the actual blocks, 16.

Since the superblock, 20, must be written atomically, its size should be the minimal block size for any block device keeping it. An example of a small device block size is 512 bytes, corresponding to a disk sector on some systems. The preferred architectural assumptions for the operating system carrying the bedrock are as follows:

1. Atomic write of the aligned atomic size data (512 bytes). Once the write begins, it must finish, or not begin at all. Most disk controllers ensure when starting a write that it will go though even in the event of a power failure.
2. Aligned atomicity—a file write begins at an atomic write boundary. Thus, if one starts to write a file by writing out an atomic-size block, the write will indeed be atomic, and so will be all the subsequent atomic-size writes.
3. Non-volatile memory, e.g. on disk. Non-volatile memory means the data written to disk stays there until overwritten by a knowing and willing user (no latent alterations by the OS).
4. fsync(2) works. Memory-buffered files must be capable of being flushed to disk at will using a system call such as Unix's fsync( ). The successful completion of the call guarantees the disk image is what the user expects it to be, and if an interruption occurs after an fsync( ), all the data written before it will persist.

These assumptions allow one to build a layer system, capable of withstanding the most typical system failures—interruptions, such as power failures, disk sector failures, etc., including stacked failures.

A bedrock file consists of a fixed number of homogeneous, fixed-size blocks 16. It is the responsibility of an application to choose the number of blocks n_blocks and block size block_size before creating a bedrock, and then manage its memory in terms of the blocks. Blocks can be allocated, written, read, and freed. The user deals with the block addresses, which are simply numbers in the range 1 . . . n_blocks. Transactional semantics requires that certain mapping information, employed by the mapping mechanism described below, is stored on disk as well.

During a transaction, the original physical blocks 16 can't be overwritten until a commit or abort. A "shadow" physical block is written instead. The logical block addresses, given to the users, are separated from physical blocks, making a map array storing the correspondence, much like virtual memory: map [logical]==physical or is marked unallocated.

Figure 4:
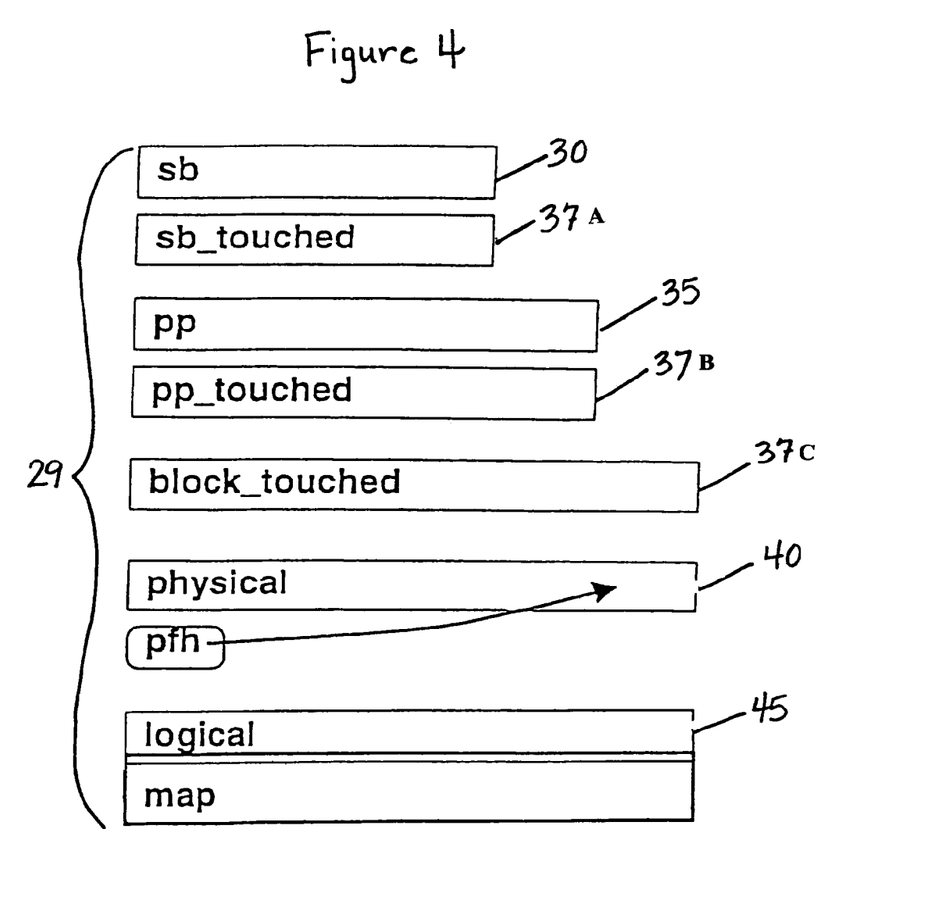
FIG. 4 represents the memory layout of the bedrock mapping mechanism.

FIGS. 3 and 4 depicts the memory layout of the bedrock mapping mechanism. Since only those portions of the map, 26, which actually changed are updated, there's no contiguous, full-size "main" or "shadow" arrays; rather, sector-size groups of mapping entries serve as either, in accordance with a ping-pong bit flag in an upper-level mapping structure. The superblock, 20, contains 512 bytes=4096 bit flags, each capable of controlling an underlying mapping page. Following the convention of grouping map entries into 512 byte segments, and representing block addresses as unsigned long 4 byte entries, one has 128 entries per map segment. Should each superblock bit control (switch) a segment directly, one would end up with only 4096*128=524288 bottom-level blocks. Since one can't enlarge the superblock, 20, without violating the atomicity condition, and the map entries and their segment sizes are likewise fixed, the invention introduces an intermediate mapping layer, which is called pages, 22. Thus, the overall mapping becomes three-level:

Superblock→Pages→Map Segments

Naturally, each page, 22, will have the atomic size of 4096 bits, controlling just as many bottom-level map segments. Each superblock, 20, bit now will govern one such page, 22. Thus, the total number of blocks switchable through the three-level mapping scheme is $4096^2*128=2^{31}$ blocks. This supremum neatly fits into a typical four-byte word, holding unsigned integer types with values as large as $2^{32}-1$. The supremum is the function of two assumptions—the atomic 512 byte sector size and 4 byte word, unsigned long int type representing block addresses. In the future, these architectural parameters are likely to change, as memory needs grow.

A version number, 24, is maintained, corresponding to the bedrock format, in each bedrock file, so it can be properly upgraded when the format evolves. The application must evaluate its needs ahead of time and create the bedrock of sufficient size, planning both the number of blocks and their size. Since every block overwritten during a transaction requires a shadow block, the total number of blocks overwritten must not exceed floor (n/2).

A single current version of the shadow mapping mechanism is kept in the memory record. All the three layers of mapping are present in a single instance each—the superblock, 20, the page array of pages, 22, and the map, 26. When an existing bedrock is open, these structures are assembled in memory via a slalom procedure. First, the single superblock, 20, is read. Each bit of it tells which corresponding page, 22, to read—since any of the two versions can be current while the other is shadow, they have no preferential names and are called simply 0 and 1 instances. The slalom proceeds by filling each memory slot in the pages array, 22, from either 0 or 1 page instance on disk, equaling the corresponding superblock bit. Once the single "current" page array, 22, is thus assembled, the slalom repeats for the map itself—its segments are recalled from either 0 or 1 disk instances, depending on the value of the controlling bit within the responsible page now.

Just upon the slalom assembly, the superblock, 20, pages, 22, and map, 26, faithfully reflect the current state of the superblock, 20. Any write operations, however, will reserve their "current" blocks, and update the map, tainting the map segments involved as "touched". The "shadow" map segments will go into the slots opposite of those they were read from during the slalom, and as the slalom assembly was governed by the page bits, the touched page bits must be flipped, too, in the shadow pages. Similarly to map/page bit flip, enacting the updated page will flip its bit in the superblock. The final superblock is thus prepared, ready for the final slide-in. Finalizing the commit requires that the operating system synchronizes its view of the file with that assumed by the bedrock module (for instance, on Unix, the fsync system call is provided to flush the buffers to disk). The actual slide-in calls fsync twice—immediately before and immediately after writing out the new superblock. Note that shadow pages and map segments can be written out in any order relative to each other, but the superblock must be written after them.

FIG. 4 depicts the memory layout of the bedrock mapping mechanism 29 map[logical]=physical. The sb, 30, and pp's, 35, are bit vectors: bit sb[i] chooses $PP_0$ v. $pp_1$ segment of 4096 bits, in the range governed by i; similarly bit pp[j] chooses $map_0$ v. $map_1$ segment of 128 unsigned long physical entries (32 bits each) for the index range (of logical addresses) based on j. The touched bit vectors, 37A-C, allow for selective writes of their "parents" upon commit or abort. The free physical, 40, and logical, 45, array lists (the latter sharing its array with map) allow for constant-time slot and address allocation, respectively; physical_freed_head (pfh) protects slots freed in the current transaction from reuse until a sync/abort.

The slalom has been abstracted and parameterized for three different occasions: read, write, and abort. It works in cooperation with the touched arrays of flags 37A-C, and is at the core of bedrock open, sync (commit), and abort operations. The touched flags 37A-C, set naturally when allocating and overwriting blocks, provide for one to write out only those parts of the maps and pages that were actually updated. Similarly, an abort will reread only those sections of that were tinkered with and need restoration from disk. In addition, one can set all bits of all touched arrays 37 A-C before an "open", then simply make a slalom read, which consequently refills all the maps and the superblock 20. Also, since the touched arrays 37 A-C accurately record all of the bit flags changed, nothing need be read but the map 29 itself when aborting.

Within the bedrock_slalom function, this ternary parameter is divided into two Boolean flags, reading and aborting. Then, the slalom goes as follows:

1. When reading, the superblock is read in first, since it has to govern the slalom-gathering of the pages.
2. The superblock is then traversed: when reading, the disk-current pages are read in accordance with the disk superblock-pages come from the current slots, those specified in the current superblock (just read). The page touched flag is reset for each page being read.

writing, the disk-shadow pages are written in accordance with the shadow, i.e. memory superblock-pages go to the shadow slots, as opposed to the current ones recorded in the disk superblock aborting, the shadow, i.e. memory, superblock bits touched during the transaction being aborted are simply reversed if they were set during it in sb_touched.

As each page 22 is read, its governing sb touched bit 37A is reset.

3. Similarly, the pages 22 are now traversed, and if aborting, simply restored by reversing those bits set in pp_touched 37B (ping-pong pages touched bits). The maps should be read back from the disk when aborting, as the original modified slots are overwritten in memory with the shadow ones. The rest is analogous to the superblock traversal.

4. Finally, in case of writing, the slide-in sequence, described above, is executed (fsync→write superblock→fsync).

Each write is given a logical address to write and a pointer to a memory buffer going to the bedrock under that address. The write checks first, whether the physical slot, already associated with the logical address given, was assigned in a previous transaction. If so, it has to be preserved, and a shadow slot is found for use in the course of this transaction. Preferably, shadow block protection should not be done twice for a logical address that already was written during this transaction.

This implementation supports a single view of the bedrock in the following sense. Suppose a new transaction begins and it performs a write operation to some bedrock address. If a read operation is issued on the same bedrock address, then the newly written data will be returned. That is, the writes performed during a transaction are reflected in subsequent reads operations in the transaction. In other words, all threads "see" only one (most recent) view of the bedrock.

An extension of the bedrock is to allow multiple time-views. This embodiment allows applications to choose between the most recent view and the view of the bedrock just before the beginning of the current transaction. The former view would reflect the writes performed during the current transaction, while the latter would not.

This embodiment is useful when the bedrock is being used to implement a database. Such as when there is a writer thread that is responsible for performing all the update operations on the database. Thus, only the writer thread issues write operations on the bedrock. There is also a reader thread that is responsible for answering user queries on the database. Thus, the read thread only issues read operations on the bedrock. Here the writer thread would like to see the most recent view of the bedrock, while the reader thread would like to see the view just before the current transaction. This is because during a transaction while the writer is performing an update on the database, the database can be in an inconsistent state. The reader would not want to see the inconsistent state of the database. Instead the reader would like to answer queries from the slightly older, but consistent view of the database.

Extensions to bedrock may include parallel transactions. Parallel transactions allow more than one transaction to be active simultaneously. This can be used where two parallel threads of computation are operating on disjoint portions of the same bedrock. In this embodiment a bedrock with support for parallel transactions will be able to provide "all or nothing" guarantees to both threads.

A further embodiment of the invention involves making the handler functions do more than the mere transfer of missing and mismatching records. Here, the abstraction of a synchronizable database can be utilized for simplifying and implementing a distributed protocol for data dispersal and information propagation in a network of widely distributed processors. An example of such a protocol is the Intermemory as described in "Towards an Archival Intermemory", Goldberg et al. Advances in Digital Libraries ADL 1998, April 22-24, Santa Barbara, Calif., 1998.

PREFERRED EMBODIMENT

A bxtree based implementation of synchronizable databases is disclosed as an example of the invention. The main power of the synchronizable databases abstraction lies in the range synchronization operation. Thus, the implementation is separated into two independently usable modules—the bxtree module and the osynch module. The two modules talk to each other through a very clean interface consisting of just two functions.

The bxtree module implements a B+-tree based database engine augmented with functions for supporting range synchronization. For example, a typical operation on the database would input a key range (i.e. an interval of the space of keys) and return a short summary. The summary would typically contain a digest of the records of interest of all the records in the database whose keys lie in the given key range. In a bxtree, the records are stored only in the leaves, and all the leaves are at the same height in the tree. With each record a fixed size digest of the record is also stored. Each internal node also stores, for each of its children, the XOR of the digests of all the records in the subtree rooted at the child. Note that since XOR is an associative operation, this information can be efficiently maintained across tree-rebalancing operations. Because of these digests stored in the internal nodes, interval summary computation operations can be performed in time proportional to the height of the tree.

This embodiment uses the XOR function to combine the digests of sets of records. In fact, any "associative" function can be used instead. There is a small probability that the synchronization algorithm is unable to identify a discrepancy between the two databases. The choice of the combining function is one of the factors that determine this probability. Some functions might be more appropriate to use than others.

Formally, one requires an associative function that takes two p bit strings and produces another p bit string as an output. Some different embodiments for the combining function are:

addition: the function views the input and output bit strings as integers. The output is the sum of the inputs in 1's complement or 2's complement, and;

matrix multiplication: the function views the input and output bit strings as m×n binary matrices (p=mn) for some m, n. If $I\_1$ and $I\_2$ are the m×n matrices corresponding to the inputs, then the m×n matrix corresponding to the output is $I\_1 \times H \times I\_2$ where H is a fixed n×m matrix. The function is parameterized by H.

The osynch (or object synchronization) module, implements the range synchronization operation on bxtree databases. This embodiment is specially tuned for the case when the databases being synchronized are located on different processors connected via a limited bandwidth link. Thus, one of the goals is to try to minimize the network traffic generated by the synchronization operation. The synchronization operation works in a number of communication rounds. In each round, the key range of interest is partitioned into smaller sub-ranges. For each sub-range, the two databases compute the summary of records lying in that sub-range and one of the databases sends its summaries to the other side. The corresponding summaries from the two sides are compared and the operation is recursively applied to sub-ranges whose summaries do not match. Only those records are transferred from one side to the other which (1) are missing on the other side, or (2) have a mismatching record on the other side. Thus, unnecessary transfer of large amounts of data is prevented.

The Bxtree Module

On an abstract level, the bxtree module simply implements a database engine for storing and managing records of the form (key, value), enhanced with some support for range synchronization. It provides functions for insertion, deletion and retrieval of records. In addition to these, it provides the following two functions which are used by the osynch module for implementing the range synchronization operation.

Get_All_Hashes: The input is an interval I of K. The output is a list of pairs of the form (key, hash). The list has one pair for each record in the database whose key field belongs to I. The first element in the pair is the key field of the record, and the second element is a fixed size digest of the record. If the database has no record with key field belonging to I, an empty list is returned.

Get_Interval_Hashes: The input is an interval I of K and a positive integer H. The function partitions I into at most H disjoint sub-intervals and returns a list of triplets of the form (key_interval, num_records, hash). The list has one triplet for each sub-interval. The first element of the triplet is the sub-interval itself; the second and third elements are, respectively, the number and a fixed size digest of all the records in the database whose key fields belong to the sub-interval. Whether the database has any records with key field belonging to I or not, the list returned is always non-empty and the sub-intervals in the list form a disjoint partition of I.

This implementation of the bxtree module uses the B+-tree data structure for storing records. The internal nodes of the tree form an index over the leaves of the tree where the real data resides. In the leaf nodes where the records are stored, a fixed size digest is also stored for each record. This digest is used (1) to verify record integrity, and (2) by functions providing support for range synchronization. Each internal node stores a set of keys to guide the search for records. In addition, for each of its children, it stores a triplet of the form (address, num_records, hash) where "address" is the address of the child node, "num_records" is the number of records in the child's sub-tree, and "hash" is the XOR of the digests of the records in the child's subtree. Since XOR is an associative operation, this information can be efficiently maintained across tree-rebalancing operations.

The database allows different records to have key and value fields of different sizes. This affects the structure of the tree in several ways. It stores each node of the tree in a separate bedrock block. Since all bedrock blocks are of the same size (in bytes), each node gets the same number of bytes of storage. Thus, two full leaf nodes can have different number of records. Similarly, two full internal nodes can have different number of keys and hence different fan-out. Hence, the property (which regular B+-trees with keys and records of fixed size exhibit) that the fan-out of any two non-root internal nodes in the tree can not differ by more than a factor of 2, is not exhibited by the tree in this implementation.

The number of nodes (or equivalently the number of bedrock blocks) accessed by an operation is a good measure of the amount of time taken. The insertion, deletion and retrieval operations make O node accesses where h is the height of the tree.

The Get_All_Hashes function is a simple recursive function having leaf nodes as the base case. The input to the function is an interval I in the totally ordered space of keys. A leaf node is said to be relevant for I if it contains a record with key field belonging to I, or if it is adjacent to a node like that in the left-to-right ordering of the leaf nodes. By this definition, the function only accesses the nodes that are relevant for I, and their ancestors. Thus it makes O(h+m) node accesses where h is the height of the tree and m is the number of leaf nodes relevant for I. Clearly, the size of the output list is an upper bound on m.

The Get_Interval_Hashes function helps the osynch module to have the sub-intervals such that the database contains almost equal amount of data in each of the sub-intervals. The balance in the tree is used in a natural way to construct such a partition. The input to the function is a key interval I, and an upper bound H on the number of subintervals in the partition. The function is implemented in a recursive fashion. A typical instance of the function works with an internal tree node N', a key interval I', and integer bound H'. First, it identifies the set S of relevant children (i.e. children whose subtrees contain nodes relevant for I'. See above for the definition of relevance). The children of N' are sorted in a natural left-to-right order. The children in S are consecutive in this left-right order. The function, then, partitions S into $S_1, \ldots, S_n$ (with n=min{H',|S|}) where each $S_i$ consists of some children in S that are consecutive in the left-to-right order. The partition is done in such a way that each $S_i$ has almost the same number of children from S. This partition of S naturally leads to a partition of I' into sub-intervals $I_1, \ldots I_n$, where $I_i$ corresponds to $S_i$. The end-points of the sub-intervals come from the set of keys stored in N', except that the left (right) end-point of $I_1$ ($I_n$) is same as the left (right) end-point of I'. The bound H' is also partitioned into $H'=h_1+\ldots+h_n$ with no two $h_i$'s differing by more than one. Then for each i, working on the children in $S_i$ (recursively or otherwise, depending on whether the children are leaf nodes or not), a partition of $I_i$ into at most $h_i$ sub-intervals is obtained. The output list for I' is formed by concatenating the sublists from each of the $S_i$'s. As described earlier, N' stores a triplet of the form (address, num_records, hash) for each of its children. The hash fields for some of the children in $S_i$ are used when $h_i$ is 1.

Again the function accesses only a portion of the sub-tree formed by leaf nodes relevant for I and their ancestors. It makes O(h+t) node accesses where t is a number bounded from above by the size of the output list.

This implementation of bxtree also stores an integral field called "version" with each record. Thus, a record is really a triplet of the form (key, version, value), although conceptually the version field can be thought of as part of the value field. The version field can be used by the handler functions that are invoked by the osynch module. For example, the version field can be used to keep track of the revisions made to the value field of a record, and then the handler function for $K_{12}$ can decide to replace the record with a smaller version field (indicating a stale value field) by the other one with a larger version (indicating a more fresh value field.)

The Osynch Module

This module implements the range synchronization operation for bxtree databases. As described earlier, the preferred implementation is designed for the case where the two databases are not located on the same processor. The two databases are assumed to be located on different processors connected via a limited bandwidth link. Thus, a major goal here is to try to minimize the traffic generated by the synchronization operation. Clearly, the problem at hand is a special case of the problem of synchronizing two bit strings located on different processors while minimizing the number of bits transferred across the network. In most situations, however, it is also desirable to minimize (or at least keep within reasonable limits) the number of communication rounds taken by the synchronization protocol. The synchronization algorithm tries to achieve both of these objectives.

In this implementation, the summary of a set of records consists of the number and a fixed size digest of records in the set of portions of one database are sent across the network in order to identify the discrepancies. Once the discrepancies are identified, only those records are transferred which need to be transferred to make the databases synchronized.

This implementation of the synchronization operation is asymmetric in the sense that it sees one database as a local database and the other one as a remote database. It is assumed that the local database can be accessed with no (or minimal) network traffic, whereas remote database accesses generate network traffic. This asymmetric view allows the module to make optimizations that minimize network traffic. Typically, the synchronization operation will be used by a processor to synchronize its local database with some remote database.

The synchronization algorithm starts by asking both databases to compute a single summary of all records lying in the given key interval. The Get_Interval_Hashes function is invoked for this. The remote summary is transferred to the local side and compared with the local summary. If the summaries match, it is concluded that the databases are already synchronized restricted to the given key interval. Otherwise the size of the remote database restricted to the given key interval is checked. If the remote database only has a small number of records lying in the key interval, then digests for all those individual records are transferred from the remote to the local side (the Get_All_Hashes function is invoked here), and a record-by-record comparison is made to identify discrepancies. Otherwise the remote database is asked (by calling the Get_Interval_Hashes function) to partition the key range into smaller sub-intervals and send summaries for each of the sub-intervals. These remote summaries are then compared against corresponding local summaries and the operation is invoked recursively for sub-interval whose summaries do not match.

The synchronization operation takes at most O(log n) communication rounds to identify each discrepancy, where n is the total size of the two databases restricted to the given key interval. Thus, the total number is communication rounds is O(t log n), where t is the combined size of the three discrepancy sets. Also, since all bxtree operations take time proportional to the height of the tree, the overall computational burden for the synchronization operation is O(t log$^2$ n).

In practice however, the number of rounds taken and the network traffic generated depend on several factors including how the discrepancies are distributed across the entire key range and how the parameters in the algorithm are chosen. There are two main parameters in the synchronization algorithm which need to be carefully chosen. The first one determines when to invoke the Get_All_Hashes operation instead of further partitioning with the Get_Interval_Hashes operation. The second parameter determines the number of partitions obtained through calls to Get_Interval_Hashes. The choice of these parameters to a very large extent determines the actual network traffic generated and the number of communication rounds taken. For example, if the algorithm decides to invoke the Get_All_Hashes function on key intervals for which the remote database has a huge number of records, then the number of communication rounds would be small but every round would generate heavy network traffic. Similarly, if the Get_All_Hashes function is invoked only on very small key intervals, then the number of rounds will be large. Note that the objective of the synchronization protocol is not only to minimize the amount of network traffic generated, but also to keep the number of communication rounds within reasonable limits. These two objectives often compete with each other. Thus, the two parameters above need to be tuned to suit different applications and conditions.

Associative functions other than XOR may be used to reduce any error possibilities. The error probability can be further reduced by using more than one digest. In other words, the summary used by the synchronization algorithm could contain a set of digests as opposed to just one digest.

The invention can be used as a building block for applications ranging from digital libraries to distributed file systems and electronic commerce. Accordingly, it should be readily appreciated that the transactional database system of the present invention has many practical applications. Additionally, although the preferred embodiment has been illustrated and described, it will be obvious to those skilled in the art that various modifications can be made without departing from the spirit and scope of this invention. Such modifications are to be considered as included in the following claims unless the claims expressly recite differently.

What is claimed is:

1. A method of minimizing network traffic during the process of synchronizing a local transaction database with a remote transaction database, comprising:

receiving from the remote transaction database a single summary hash computed for database records lying in an interval in the remote transaction database;

comparing the single summary hash to a local single summary hash computed for database records lying in a same interval in the local transaction database; and when the single summary hash does not match the local summary hash, partitioning the interval into at least a first and a second sub-interval and requesting from the remote transaction database a first sub-interval summary hash and a second sub-interval summary hash, the first sub-interval summary hash computed for database records lying in the first sub-interval in the remote transaction database and the second sub-interval summary hash computed for database records lying in the second sub-interval in the remote transaction database, whereby the database can avoid updating database records in a sub-interval at the occurrence of a match between a local sub-interval summary hash and a sub-interval summary hash received from the remote transaction database.

2. The method of claim 1 further comprising the step of: when the local sub-interval summary hash does not match the sub-interval summary hash received from the remote transaction database, further partitioning the sub-interval into at least a first and a second sub-sub-interval and requesting from the remote transaction database a first and second sub-sub-interval summary hash, the first sub-sub-interval summary hash computed for database records lying in the first sub-sub-interval in the remote transaction database and the second sub-sub-interval summary hash computed for database records lying in the second sub-sub-interval in the remote transaction database.

3. The method of claim 1 further comprising the step of: when the local sub-interval summary hash does not match the sub-interval summary hash received from the remote transaction database, requesting from the remote transaction database a hash value for each database record lying in the sub-interval.

4. The method of claim 1, wherein each database record has a hash value and wherein each summary hash for an interval is computed by combining the hash values for each database record in the interval.

5. The method of claim 4, wherein the summary hashes for different intervals are stored in a free structure.

6. The method of claim 5, wherein the free structure is a B+ tree structure.

7. The method of claim 5, wherein the hash values are message digests and wherein the hash values are combined to compute a summary hash by an excusive or (XOR) of the hash values.

8. A computer implemented synchronizable transactional database comprising:
   a database;
   an interval hash value computing module coupled to the database and configured to compute a summary hash of a plurality of hash values, each hash value associated with a database record lying in an interval of the database; and
   a synchronization module coupled to the database and to the interval hash value computing module, the synchronization module configured to identify database records that need synchronization by comparing a summary hash from the interval hash value computing module computed for database records lying in an interval of the database with a remote summary hash received from a remote transaction database, the synchronization module further configured to partition an interval into at least a first and a second subinterval when a summary hash for the interval in the database does not match a remote summary hash so as to seek remote summary hashes for the first and second sub-intervals from the remote transaction database,
   whereby the database can avoid updating database records in a sub-interval at the occurrence of a match between a local sub-interval summary hash and a sub-interval summary hash received from the remote transaction database.

9. The system of claim 8, wherein the database further comprises a transactional support layer configured to support a storage layer of the database, the transactional support layer further comprising shadow blocks which provides for atomized updates to the storage layer.

10. The system of claim 9, wherein to interval hash value computing module computes a summary hash for database records lying in an interval in the database by combining the hash values associated with each database record lying in the interval.

11. The system of claim 10, wherein the summary hashes for different intervals are stored in a tree structure.

12. The system of claim 11, wherein the free structure is a B+ tree structure.

13. The system of claim 11, wherein the hash values are message digests and wherein the hash values are combined to compute a summary hash by using an excusive or (XOR) of the hash values.

* * * * *